US010060602B2

(12) United States Patent
Akiyama (10) Patent No.: US 10,060,602 B2
(45) Date of Patent: Aug. 28, 2018

(54) ILLUMINATOR AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/694,052

(22) Filed: Sep. 1, 2017

(65) Prior Publication Data

US 2018/0066828 A1    Mar. 8, 2018

(30) Foreign Application Priority Data

Sep. 6, 2016  (JP) .................................. 2016-173581

(51) Int. Cl.
*F21V 14/08*    (2006.01)
*F21V 9/14*    (2006.01)
(Continued)

(52) U.S. Cl.
CPC ................ *F21V 14/08* (2013.01); *F21V 9/14* (2013.01); *G02B 27/285* (2013.01);
(Continued)

(58) Field of Classification Search
CPC .... G03B 21/28; G03B 21/204; G03B 21/208; G03B 21/2013; G03B 21/2033;
(Continued)

(56) References Cited

U.S. PATENT DOCUMENTS 6,402,323 B1 *   6/2002   Shiue ................. G03B 21/2066
                                                   349/9
2003/0117595 A1 *  6/2003  Li ........................ G02B 27/283
                                                   353/31
(Continued)

FOREIGN PATENT DOCUMENTS

DE    10 2014 224934 A1   6/2016
JP       2012-18208 A      1/2012
(Continued)

OTHER PUBLICATIONS

Feb. 2, 2018 Search Report issued in European Patent Application No. 17189484.3.

*Primary Examiner* — Sultan Chowdhury
(74) *Attorney, Agent, or Firm* — Oliff PLC (57) ABSTRACT

An illuminator includes a first light source unit that outputs first light beams and a second light source unit that outputs second light beams. A polarization combining element combines the first and second light beams with each other. A polarization state conversion element which receives the combined light includes retardation elements that are separate from one another and arranged in a first direction. The light source units are so configured that first regions through which the first light beams pass and second regions through which the second light beams pass are alternately arranged in the first direction in the polarization state conversion element. A polarization separation element separates the combined light having passed through the polarization state conversion element into first light and second light. A wavelength conversion element converts the first light into third light. The illuminator outputs the second light and the third light.

10 Claims, 8 Drawing Sheets

(51) Int. Cl.
- *G03B 21/20* (2006.01)
- *G02B 27/28* (2006.01)
- *H04N 9/31* (2006.01)
- *F21Y 115/30* (2016.01)
- *F21V 5/00* (2018.01)
- *G03B 33/12* (2006.01)
- *G02B 26/00* (2006.01)

(52) U.S. Cl.
CPC ....... *G02B 27/286* (2013.01); *G03B 21/2013* (2013.01); *G03B 21/2073* (2013.01); *H04N 9/3158* (2013.01); *F21V 5/007* (2013.01); *F21V 5/008* (2013.01); *F21Y 2115/30* (2016.08); *G02B 26/007* (2013.01); *G03B 21/204* (2013.01); *G03B 21/208* (2013.01); *G03B 33/12* (2013.01); *H04N 9/3161* (2013.01); *H04N 9/3197* (2013.01)

(58) Field of Classification Search
CPC ............ G03B 21/2053; G03B 21/2073; H04N 9/3105; H04N 9/3152; H04N 9/3164; H04N 9/3167; H04N 9/3197; F21V 9/08; F21V 9/14; F21V 9/20; F21V 9/30
See application file for complete search history.

(56) References Cited

U.S. PATENT DOCUMENTS

| | | |
|---|---|---|
| 2004/0252744 A1 | 12/2004 | Anikitchev et al. |
| 2008/0018861 A1* | 1/2008 | Schuck ............... G02B 6/0096 353/20 |
| 2011/0187998 A1 | 8/2011 | Kimura et al. |
| 2012/0008098 A1 | 1/2012 | Akiyama |
| 2012/0081679 A1 | 4/2012 | Matsumoto |
| 2012/0140183 A1 | 6/2012 | Tanaka et al. |
| 2014/0036943 A1 | 2/2014 | Janssens et al. |
| 2014/0211170 A1 | 7/2014 | Kitano et al. |
| 2015/0153020 A1 | 6/2015 | Akiyama |
| 2016/0161835 A1 | 6/2016 | Schnarrenberger |

FOREIGN PATENT DOCUMENTS

| | | |
|---|---|---|
| JP | 2012-78537 A | 4/2012 |
| JP | 2012-137744 A | 7/2012 |
| JP | 2013-114980 A | 6/2013 |
| JP | 2014-160233 A | 9/2014 |
| JP | 2015-106130 A | 6/2015 |
| JP | 2016-186892 A | 10/2016 |

* cited by examiner

ILLUMINATOR AND PROJECTOR

BACKGROUND

1. Technical Field

The present invention relates to an illuminator and a projector.

2. Related Art

JP-A-2012-137744, for example, discloses an illuminator which is used in a projector and in which a retardation film through which light from a solid-state light source unit including a plurality of semiconductor lasers passes is rotated to change the ratio between an S-polarized component reflected off a dichroic mirror and incident on a fluorescence emitting plate and a P-polarized component passing through the dichroic mirror and incident on the reflection plate.

In general, to increase the brightness of an image displayed by a projector, the amount of light outputted from an illuminator may be simply increased. As an example for achieving a bright image, USP Application Publication No. 2004/0252744 discloses an illuminator that combines light beams emitted from two laser arrays with each other to increase the amount of light. The illuminator uses a polarizing beam splitter or a plurality of stripe mirrors as a light beam flux combining element that combines light beam fluxes with one another. In the case where a polarizing beam splitter is used as the light beam flux combining element, the polarizing beam splitter transmits P-polarized light emitted from one of the laser arrays and reflects S-polarized light emitted from the other laser array to combine the two light beam fluxes with each other.

On the other hand, in the case where a plurality of stripe mirrors are used as the light beam flux combining element, the plurality of stripe mirrors cause the light emitted from one of the laser arrays to pass through the spaces between the mirrors and further cause the light emitted from the other laser array to be reflected off the mirrors to combine the two light fluxes with each other.

To increase the amount of light in the illuminator in JP-A-2012-137744, it is conceivable to combine the illuminator with the polarizing beam splitter disclosed in USP Application Publication No. 2004/0252744. In a case where the two laser arrays emit the P-polarized and S-polarized light beams of the same amount, however, the ratio between the S-polarized light incident on the fluorescence emitting plate and the P-polarized light incident on the reflection plate cannot be changed even by rotating the retardation film.

It is further conceivable to combine the illuminator in JP-A-2012-137744 with the plurality of stripe mirrors disclosed in USP Application Publication No. 2004/0252744. In a case where the distance between the light beams emitted from the plurality of semiconductor lasers is smaller than the diameter of the light beams, the light beams are blocked by the stripe mirrors, resulting in optical loss. The pitch at which the semiconductor lasers are arranged cannot therefore be reduced, and it is therefore difficult to reduce the size of the illuminator. Further, it is necessary to align each of the stripe mirrors with the semiconductor laser corresponding to the stripe mirror, and the alignment task is cumbersome.

SUMMARY

An advantage of some aspects of the invention is to provide an illuminator capable of adjusting the ratio between P-polarized light and S-polarized light and using light efficiently. Another advantage of some aspects of the invention is to provide a projector including the illuminator.

According to a first aspect of the invention, an illuminator is provided. The illuminator includes a first light source unit that includes a plurality of first solid-state light sources and outputs a plurality of first light beams, a second light source unit that includes a plurality of second solid-state light sources and outputs a plurality of second light beams having a polarization state different from a polarization state of the plurality of first light beams, a polarization combining element that combines the plurality of first light beams with the plurality of second light beams, a polarization state conversion element on which the combined light produced by the polarization combining element is incident, a polarization separation element that separates the combined light having passed through the polarization state conversion element into first light and second light having a polarization state different from a polarization state of the first light, and a wavelength conversion element that converts the first light into third light, and the illuminator outputs the second light and the third light as illumination light. The polarization state conversion element includes a plurality of retardation elements that are separate from one another and arranged in a first direction, and the first light source unit and the second light source unit are so configured that a plurality of first regions through which the plurality of first light beams pass and a plurality of second regions through which the plurality of second light beams pass are alternately arranged in the first direction in the polarization state conversion element.

In the illuminator according to the first aspect, even when the first light beams and the second light beams have the same amount of light, appropriately setting the positional relationship between the polarization state conversion element and the optical axis of the combined light in the first direction allows adjustment of the ratio between the first light and the second light. Further, even when the pitch at which the solid-state light sources are arranged is set at a short value that causes the distance between the light beams to be smaller than the diameter of the light beams, the light from the first and second light source units can be effectively used. Moreover, unlike a case where the stripe mirrors of the related art are used to combine light beams with each other, positioning the retardation elements and the respective solid-state light sources with high accuracy is not required.

In the first aspect described above, it is preferable that the plurality of retardation elements are each formed of a half-wave plate.

According to the configuration described above, the light beams having passed through the retardation elements can be converted from P-polarized light into S-polarized light or from S-polarized light into P-polarized light.

In the first aspect described above, it is preferable that the illuminator further includes a driver that changes a positional relationship between the polarization state conversion element and an optical axis of the combined light in the first direction.

According to the configuration described above, the ratio between the first light and the second light can be adjusted.

In the first aspect described above, it is preferable that the illuminator further includes a color balance detector that detects color balance of the illumination light, and that the driver is configured to change the positional relationship in accordance with a signal from the color balance detector.

According to the configuration described above, when the color balance changes, changing the positional relationship in the first direction allows adjustment of the color balance of the illumination light outputted from the illuminator.

According to a second aspect of the invention, a projector is provided. The projector includes the illuminator according to the first aspect described above, a light modulator that modulates the illumination light from the illuminator in accordance with image information to form image light, and a projection system that projects the image light.

The projector according to the second aspect, which includes the illuminator according to the first aspect described above, allows excellent white balance of an image and high-quality display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

Figure 1:
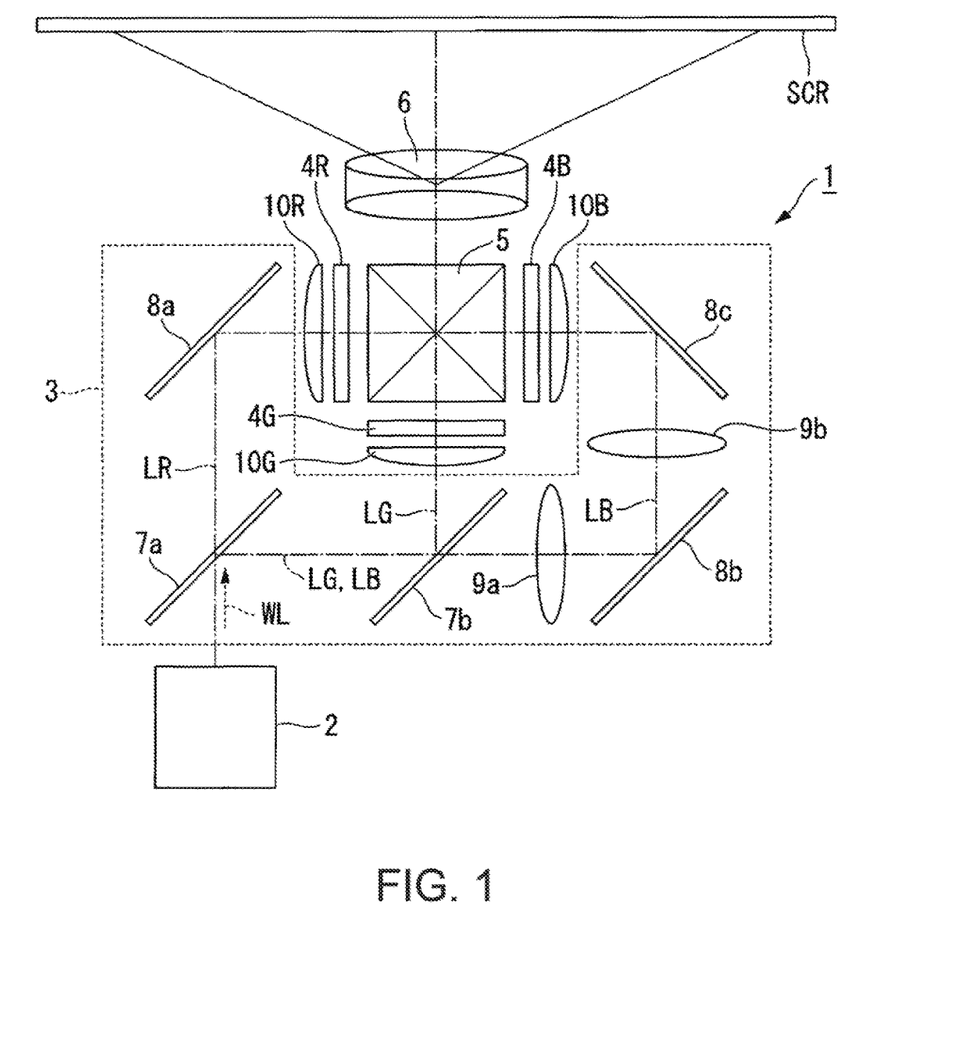
FIG. 1 is a schematic view showing the optical system of a projector according to a first embodiment.

FIG. 1 is a schematic configuration diagram showing a projector according to the present embodiment.

A projector 1 according to the present embodiment is a projection-type image display apparatus that displays a color image on a screen SCR, as shown in FIG. 1. The projector 1 uses three light modulators corresponding to three color light fluxes, red light LR, green light LG, and blue light LB.

The projector 1 generally includes an illuminator 2, a color separation system 3, a light modulator 4R for red light, a light modulator 4G for green light, a light modulator 4B for blue light, a light combining system 5, and a projection system 6. The illuminator 2 outputs illumination light WL having a uniform illuminance distribution toward the color separation system 3.

The color separation system 3 separates the illumination light WL outputted from the illuminator into the red light LR, the green light LG, and the blue light LB. The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has the function of separating the illumination light WL outputted from the illuminator 2 into the red light LR and the combination of the green light LG and the blue light LB. The first dichroic mirror 7a transmits the red light LR but reflects the green light LG and the blue light LB. The second dichroic mirror 7b has the function of separating the light reflected off the first dichroic mirror 7a into the green light LG and the blue light LB. The second dichroic mirror 7b reflects the green light LG but transmits the blue light LB.

The first reflection mirror 8a is disposed in the optical path of the red light LR. The first reflection mirror 8a reflects the red light LR having passed through the first dichroic mirror 7a toward the light modulator 4R for red light. The second reflection mirror 8b and the third reflection mirror 8c are disposed in the optical path of the blue light LB. The second reflection mirror 8b and the third reflection mirror 8c guide the blue light LB having passed through the second dichroic mirror 7b to the light modulator 4B for blue light. The green light LG is reflected off the second dichroic mirror 7b and directed toward the light modulator 4G for green light.

The first relay lens 9a and the second relay lens 9b are disposed in the optical path of the blue light LB and on the light exiting side of the second dichroic mirror 7b. The first relay lens 9a and the second relay lens 9b have the function of compensating optical loss of the blue light LB due to the fact that the optical path of the blue light LB is longer than the optical paths of the red light LR and the green light LG.

The light modulator 4R for red light modulates the red light LR in accordance with image information to form red image light. The light modulator 4G for green light modulates the green light LG in accordance with image information to form green image light. The light modulator 4B for blue light modulates the blue light LB in accordance with image information to form blue image light.

The light modulator 4R for red light, the light modulator 4G for green light, and the light modulator 4B for blue light are each formed, for example, of a transmissive liquid crystal panel. A pair of polarizers that are not shown are disposed on the light incident side and the light exiting side of each of the liquid crystal panels. The pair of polarizers transmit light linearly polarized in a specific direction.

A field lens 10R is disposed on the light incident side of the light modulator 4R for red light. A field lens 10G is disposed on the light incident side of the light modulator 4G for green light. A field lens 10B is disposed on the light incident side of the light modulator 4B for blue light. The field lens 10R parallelizes the red light LR to be incident on the light modulator 4R for red light. The field lens 10G parallelizes the green light LG to be incident on the light modulator 4G for green light. The field lens 10B parallelizes the blue light LB to be incident on the light modulator 4B for blue light.

The light combining system 5 combines the red, green, and blue image light fluxes with one another and directs the combined image light toward the projection system 6. The light combining system 5 is formed, for example, of a cross dichroic prism.

The projection system 6 is formed of a projection lens group including a plurality of projection lenses. The projection system 6 enlarges the combined image light from the light combining system 5 and projects the enlarged image light toward the screen SCR. An enlarged color image is thus displayed on the screen SCR.

The illuminator 2 will subsequently be described.

Figure 2:
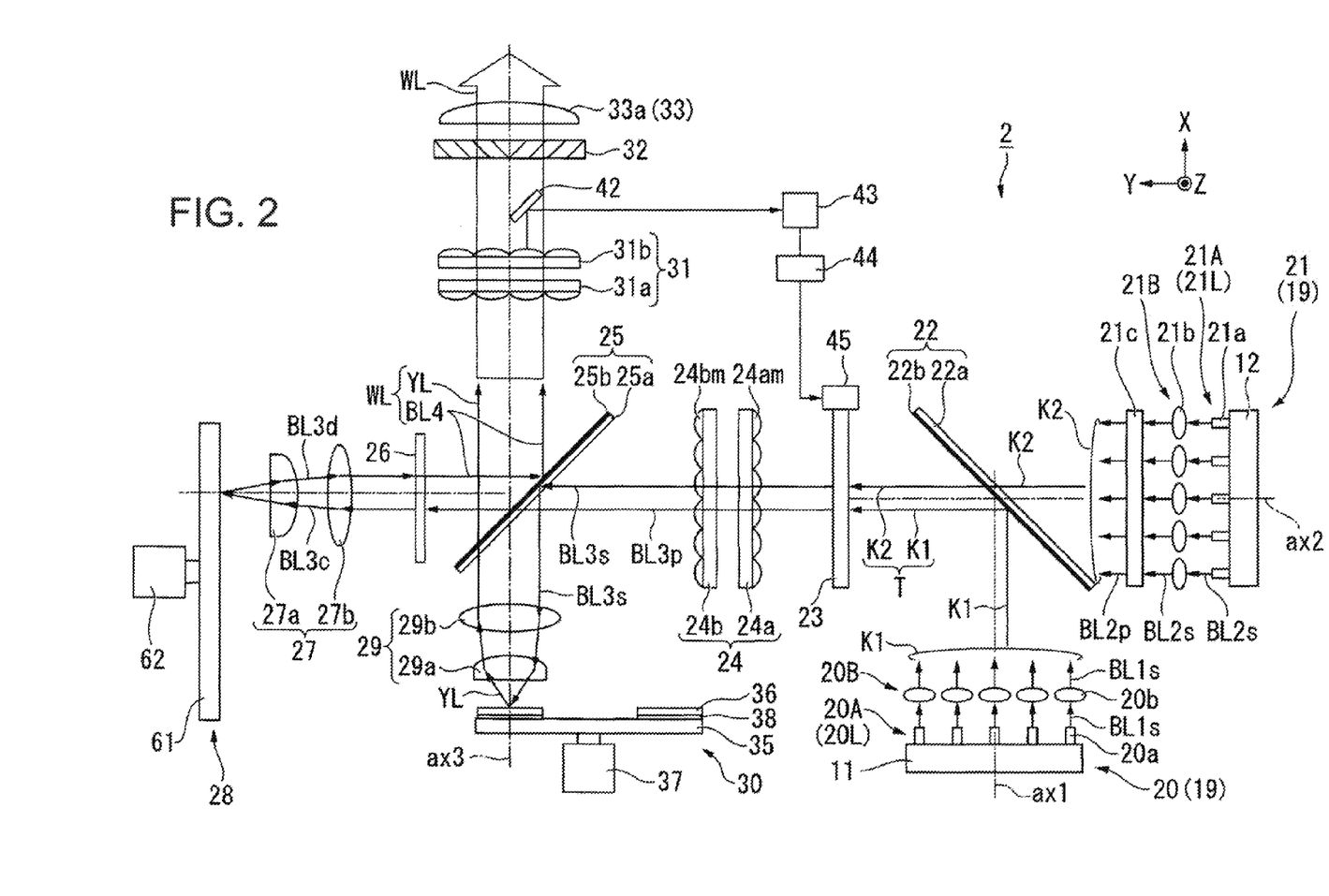
FIG. 2 is a schematic configuration diagram of an illuminator.

FIG. 2 is a schematic configuration diagram of the illuminator 2.

The illuminator 2 includes a light source 19, a polarization combining element 22, a polarization state conversion element 23, a homogenizer system 24, a polarization separation element 25, a retardation film 26, a first pickup lens unit 27, a diffuser wheel 28, a second pickup lens unit 29, a phosphor wheel 30, an optical integration system 31, a polarization conversion element 32, and a superimposing system 33, as shown in FIG. 2.

The light source 19 includes a first light source unit 20 and a second light source unit 21.

The first light source unit 20 includes a first array light source 20A and a first collimator system 20B. The second light source unit 21 includes a second array light source 21A and a second collimator system 21B.

In the following description with reference to the drawings, the description is made by using an XYZ coordinate system in some cases. The direction X is the direction parallel to an illumination optical axis ax3 of the illuminator 2. The direction Y is the direction parallel to the optical axis ax2 of the second array light source 21A. The direction Z is the direction perpendicular to the directions X and Y.

The first array light source 20A has laser rows 20L each formed of a plurality of semiconductor lasers 20a. The semiconductor lasers 20a, which form the laser rows 20L, are disposed on a support member 11. The support member functions as a heat sink that dissipates heat generated by the semiconductor lasers 20a.

In the present embodiment, the first array light source 20A includes a plurality of the laser rows 20L, each of which extends in the direction Y. In the present embodiment, five laser rows 20L are arranged in the direction Z. The laser rows 20L are each formed of five semiconductor lasers 20a. That is, the plurality of semiconductor lasers 20a are arranged in an array in a plane perpendicular to the optical axis ax1 of the first array light source 20A (in YX plane).

The semiconductor lasers 20a each emit a blue light beam BL1s. The light beam BL1s is a laser beam, for example, having a peak wavelength of 445 nm. The polarization state of the light beam BL1s is S polarization with respect to the polarization combining element 22, which will be described later, and the light beam BL1s is therefore reflected off the polarization combining element 22. In the present embodiment, the semiconductor lasers 20a correspond to the "first solid-state light sources" described in the appended claims, and the light beams BL1s correspond to the "first light beam" described in the appended claims.

Figure 3:
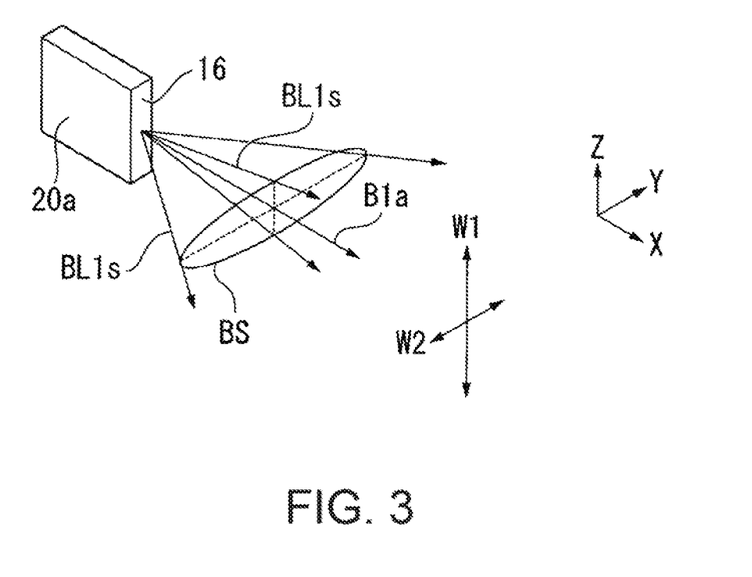
FIG. 3 shows the configuration of a key part of a semiconductor laser.

FIG. 3 shows the configuration of a key part of each of the semiconductor lasers 20a provided in the first array light source 20A.

The semiconductor lasers 20a each have a light exiting surface 16, through which light is emitted, as shown in FIG. 3. The light exiting surface 16 has a roughly rectangular planar shape having a lengthwise direction W1 and a widthwise direction W2 when the light exiting surface 16 is viewed from the direction along a principal ray B1a of the emitted light beam BL1s. The lengthwise direction W1 is parallel to the direction Z, and the widthwise direction W2 is parallel to the direction Y.

The light beam BL1s emitted from each of the semiconductor lasers 20a is formed, for example, of linearly polarized light having a polarization direction parallel to the lengthwise direction W1. The light beam BL1s spreads in the widthwise direction W2 by a greater amount than in the lengthwise direction W1. The light beam BL1s therefore has an elliptical cross-sectional shape BS having a major axis direction along the direction Y (widthwise direction W2).

In the present embodiment, the plurality of semiconductor lasers 20a are so arranged that the principal ray B1a of the light beam BL1s emitted from each of the semiconductor lasers 20a is parallel to the direction X.

Referring back to FIG. 2, the light beams BL1s emitted from the first array light source 20A enter the first collimator system 20B. The first collimator system 20B is formed of a plurality of collimator lenses 20b arranged in an array. The collimator lenses 20b each convert the light beam BL1s emitted from the corresponding semiconductor laser 20a into parallelized light.

The second array light source 21A has laser rows 21L each formed of a plurality of semiconductor lasers 21a. The semiconductor lasers 21a, which form the laser rows 21L, are disposed on a support member 12.

In the present embodiment, the second array light source 21A includes a plurality of the laser rows 21L, each of which extends in the direction X. In the present embodiment, five laser rows 21L are arranged in the direction Z. The laser rows 21L are each formed of five semiconductor lasers 21a. That is, the plurality of semiconductor lasers 21a are arranged in an array in a plane perpendicular to the optical axis ax2 (in XZ plane).

The semiconductor lasers 21a each emit a blue light beam BL2s. The light beam BL2s is a laser beam, for example, having a peak wavelength of 445 nm, and the polarization state of the light beam BL2s is S polarization with respect to the polarization combining element 22, which will be described later. In the present embodiment, the semiconductor lasers 21a correspond to the "second solid-state light sources" described in the appended claims, and the light beams BL2s correspond to the "second light beam" described in the appended claims. The semiconductor lasers 21a have the same configuration as that of the semiconductor lasers 20a. The light beams BL2s therefore each also have an elliptical cross-sectional shape BS having a major axis along the widthwise direction W2 (see FIG. 3). In the above description, the light beams BL2s are each a laser beam having the same peak wavelength of the light beams BL1s by way of example but may instead be a laser beam, for example, having a peak wavelength of 465 nm.

The plurality of light beams BL2s emitted from the second light source unit 21 enter the second collimator system 21B. The second collimator system 21B is formed of a plurality of collimator lenses 21b arranged in an array. The collimator lenses 21b each convert the light beam BL2s emitted from the corresponding semiconductor laser 21a into parallelized light.

The second light source unit 21 further includes a retardation film 21c disposed between the second collimator system 21B and the polarization combining element 22. The retardation film 21c is a half-wave plate. The plurality of light beams BL2s, when passing through the retardation film 21c, are converted into light beams BL2p, each of which is P-polarized light with respect to the polarization combining element 22. The plurality of light beams BL2$p$ can therefore pass through the polarization combining element 22.

In the present embodiment, the laser trains 20L and 21L are disposed in different positions in the direction Z from each other.

The first light source unit 20 and the second light source unit 21 are therefore so configured that the first regions A1, through which the light beams BL1$s$ pass, and second regions A2, through which the light beams BL2$p$ pass, are alternately arranged in the Z direction (see FIG. 4) in the polarization state conversion element 23, which will be described later.

On the basis of the configuration described above, the first light source unit 20 outputs the S-polarized light beams BL1$s$ toward the polarization combining element 22, and the second light source unit 21 outputs the P-polarized light beams BL2$p$ toward the polarization combining element 22.

In the present embodiment, the light outputted from the first light source unit 20 and the light outputted from the second light source unit 21 differ from each other in terms of polarization state, as described above.

In the following description, the flux of the S-polarized light beams BL1$s$ outputted from the first light source unit 20 is called a light beam flux K1, and the flux of the P-polarized light beams BL2$p$ outputted from the second light source unit 21 is called a light beam flux K2 in some cases. In the present embodiment, the amount of light beam flux K1 is equal to the amount of light beam flux K2.

The first light source unit 20 and the polarization combining element 22 are arranged next to each other along the optical axis ax1. The second light source unit 21, the polarization combining element 22, the polarization state conversion element 23, the homogenizer system 24, the polarization separation element 25, the retardation film 26, the first pickup lens unit 27, and the diffuser wheel 28 are sequentially arranged along the optical axis ax2. The phosphor wheel 30, the second pickup lens unit 29, the polarization separation element 25, the optical integration system 31, the polarization conversion element 32, and the superimposing system 33 are sequentially arranged on the illumination optical axis ax3. The optical axis ax1 and the optical axis ax2 are in the same plane and perpendicular to each other. The illumination optical axis ax3 is present in the plane where the optical axes ax1 and ax2 are present and parallel to the optical axis ax1. The illumination optical axis ax3 is perpendicular to the optical axis ax2.

The polarization combining element 22 combines the light beam flux K1 and the light beam flux K2 with each other. The polarization combining element 22 is so disposed as to incline by 45° with respect to the optical axes ax1 and ax2. The polarization combining element 22 includes a transparent substrate 22$a$ and a polarization combining film 22$b$ supported by the transparent substrate 22$a$.

The polarization combining film 22$b$ is formed of a polarizing beam splitter. The S-polarized light beam flux K1 is reflected off the polarization combining film 22$b$, and the P-polarized light beam flux K2 passes through the polarization combining film 22$b$.

The light beam fluxes K1 and K2 are therefore combined with each other to produce combined light T.

The combined light T combined by the polarization combining element 22 enters the polarization state conversion element 23.

Figure 4:
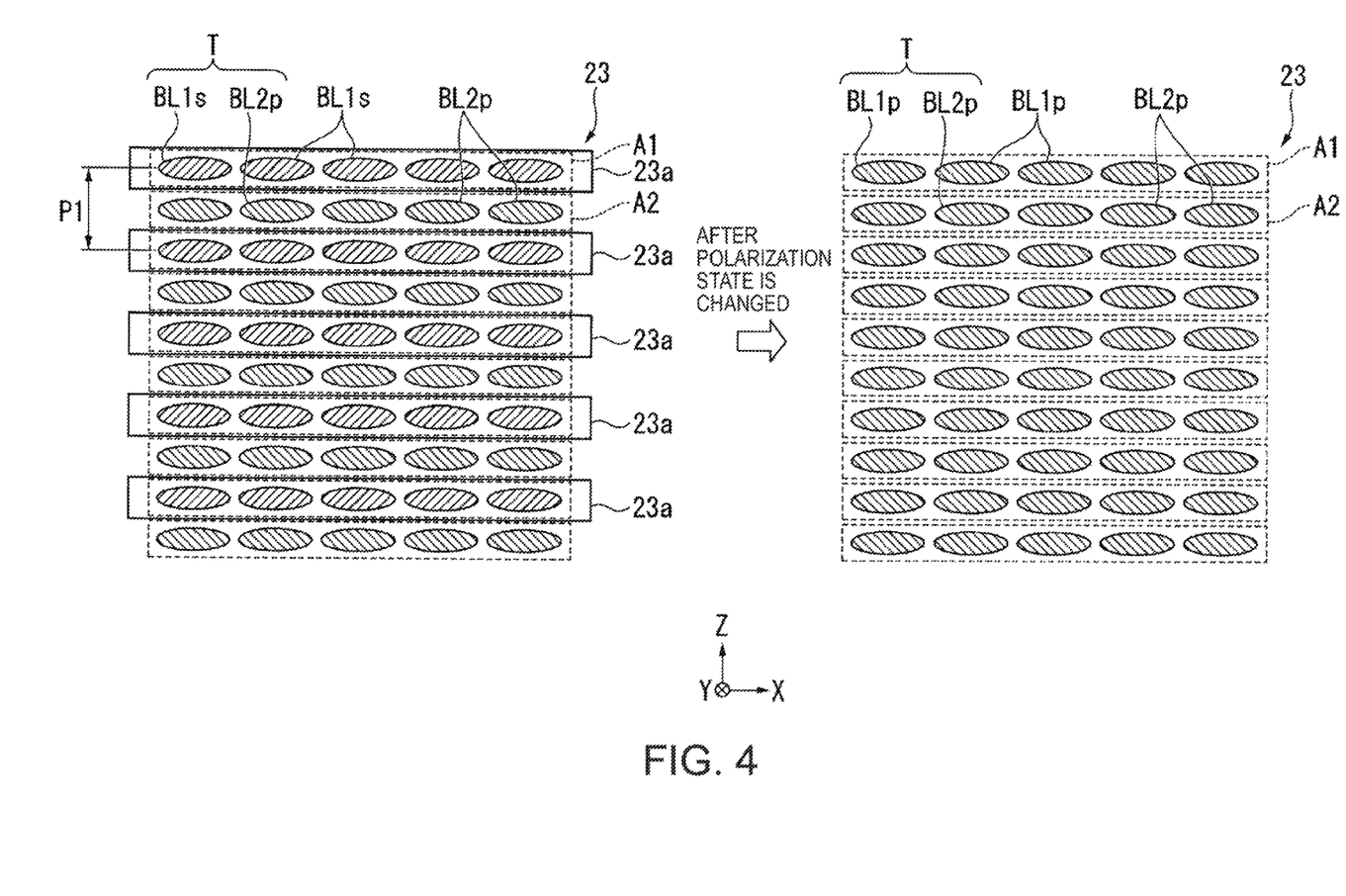
FIG. 4 is a plan view showing a schematic configuration of a polarization state conversion element.

FIG. 4 is a plan view showing a schematic configuration of the polarization state conversion element 23. FIG. 4 also shows the combined light T incident on the polarization state conversion element 23. A region where the five light beams BL1$s$ outputted from one laser row 20L pass through the polarization state conversion element 23 is called a first region A1, and a region where the five light beams BL2$p$ outputted from one laser row 21L pass through the polarization state conversion element 23 is called a second region A2. In the present embodiment, the number of the first regions A1 and the number of the second regions A2 are both five. Each of the first regions A1 is formed of five ellipses arranged in the direction X but is diagrammatically drawn in the form of a rectangular region, as seen from FIG. 4. The same holds true for the second region A2.

In the polarization state conversion element 23, the first regions A1 and the second regions A2 are alternately arranged in the direction in which retardation elements 23$a$ are arranged (direction 2). The pitch of the first regions A1 is equal to the pitch of the laser rows 20L or is P1. The pitch of the second regions A2 is equal to the pitch of the laser rows 21L or is P1.

The polarization state conversion element 23 includes a plurality of the retardation elements 23$a$, as shown in FIG. 4. The retardation elements 23$a$ are arranged in the direction Z at a pitch P1 with a gap of P1/2. The plurality of retardation elements 23$a$ are each formed of a half-wave plate having a stripe shape extending in the direction X. In the present embodiment, the direction Z, in which the plurality of retardation elements 23$a$ are arranged, corresponds to the "first direction" described in the appended claims. The plurality of retardation elements 23$a$ may be provided independently of each other or may be supported by a single transparent member.

In the state shown in FIG. 4, one first region A1 overlaps with one retardation element 23$a$, and one second region A2 is positioned between two retardation elements 23$a$ adjacent to each other. That is, one light beam BL1$s$ falls within one retardation element 23$a$, and one light beam BL2$p$ falls within the region between two retardation elements 23$a$ adjacent to each other. Since the Z-direction width of each of the light beams BL1$s$ is equal to the Z-direction width of each of the light beams BL2$p$, the Z-direction width of each of the retardation elements 23$a$ is equal to the distance between two retardation elements 23$a$ adjacent to each other.

The S-polarized light beams BL1$s$ pass through the retardation elements 23$a$ and are therefore converted into P-polarized light beams BL1$p$. The P-polarized light beams BL2$p$, which do not enter the retardation elements 23$a$, pass through the polarization state conversion element 23 with the polarization state of the light beams BL2$p$ remaining P-polarized.

That is, the combined light T having passed through the polarization state conversion element 23 is formed only of the P-polarized light beams BL1$p$ and BL2$p$. Therefore, in the state in which the polarization state conversion element 23 and the optical axis of the combined light T in the direction Z are related to each other in terms of position in the direction Z as shown in FIG. 4, the ratio between the P-polarized component and the S-polarized component in the combined light T having passed through the polarization state conversion element 23 is 100:0.

In the illuminator 2 according to the present embodiment, changing the Z-direction positional relationship between the polarization state conversion element 23 and the optical axis of the combined light T allows the polarization state of the combined light T to be arbitrarily set. Specifically, the illuminator 2 according to the present embodiment further includes a mirror 42 for monitoring the amount of light, a sensor unit 43, a controller 44, and a driver 45, as shown in FIG. 2. The driver 45 moves the polarization state conversion element 23 in the direction Z to change the Z-direction positional relationship.

In the present embodiment, the mirror 42 for monitoring the amount of light is provided in the optical path between the optical integration system 31 and the polarization conversion element 32. The mirror 42 for monitoring the amount of light is so disposed as to incline by 45° with respect to the illumination optical axis ax3. The mirror 42 for monitoring the amount of light transmits part of the light incident thereon and reflects the remainder. The light having passed through the mirror 42 for monitoring the amount of light is incident on the polarization conversion element 32, and the light reflected off the mirror 42 for monitoring the amount of light is incident on the sensor unit 43.

The sensor unit 43 detects white balance (color balance) of the illumination light WL outputted from the illuminator 2. The illumination light WL is formed of yellow fluorescence YL and blue light BL4, as will be described later. The sensor unit 43 transmits a result of the detection to the controller 44.

The controller 44 operates the driver 45 on the basis of the signal from the sensor unit 43 (result of detection of color balance). That is, the driver 45 changes the Z-direction positional relationship described above on the basis of the signal from the sensor unit 43. The sensor unit 43 in the present embodiment corresponds to the "color balance detector" described in the appended claims.

Figure 5:
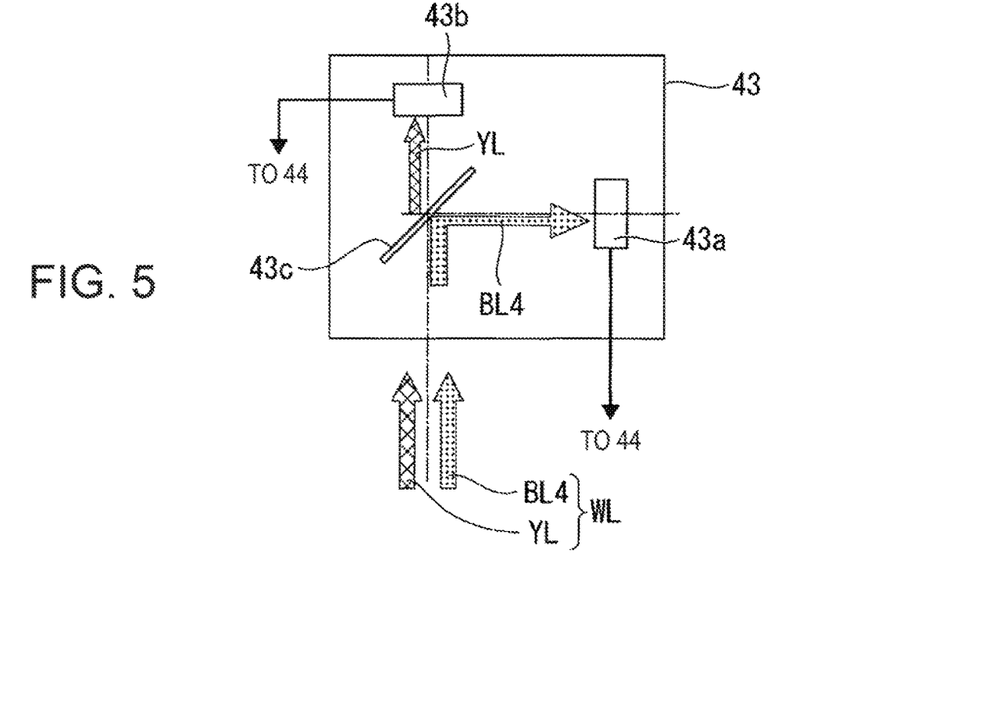
FIG. 5 shows a schematic configuration of a sensor unit.
Figure 6:
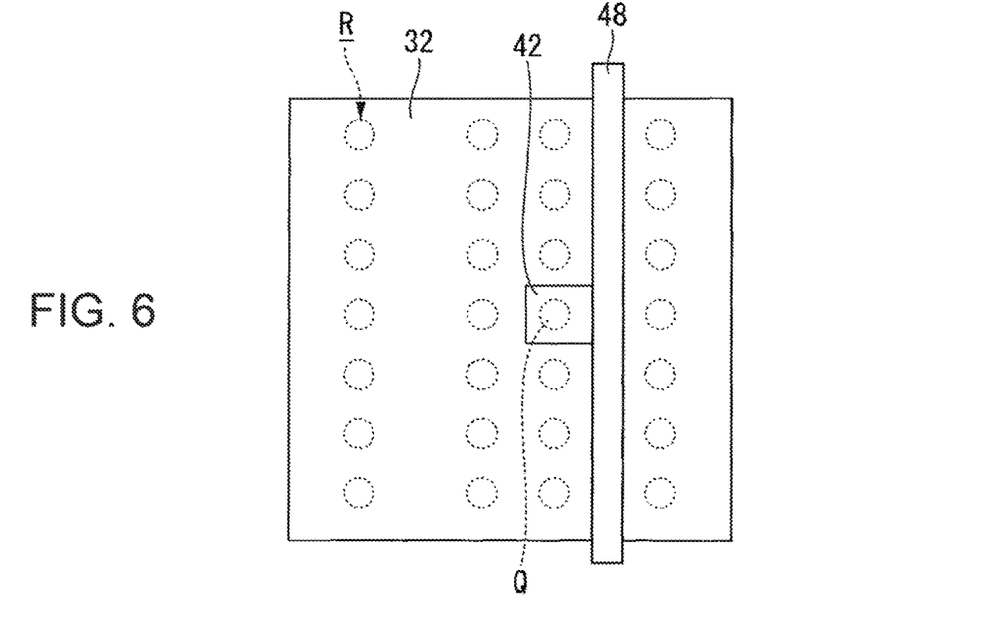
FIG. 6 is a front view showing the arrangement of a mirror in a polarization conversion element.

FIG. 5 shows a schematic configuration of the sensor unit 43. FIG. 6 is a front view showing the arrangement of the mirror in the polarization conversion element 32.

The sensor unit 43 includes a first sensor 43a, a second sensor 43b, and a dichroic mirror 43c, as shown in FIG. 5. The dichroic mirror 43c is formed of a dielectric multilayer film and transmits the fluorescence YL out of the illumination light WL but reflects the blue light BL4 out of the illumination light WL.

The first sensor 43a detects the amount of blue light BL4 reflected off the dichroic mirror 43c. The second sensor 43b detects the amount of fluorescence YL having passed through the dichroic mirror 43c. The first sensor 43a and the second sensor 43b are electrically connected to the controller 44 and transmit results of the detection to the controller 44. The controller 44 controls the movement of the polarization state conversion element 23 moved by the driver 45 on the basis of the results of the detection performed by the first sensor 43a and the second sensor 43b.

The mirror 42 for monitoring the amount of light is held by a holding member 48, which is so disposed not to block a plurality of light incident regions R of the polarization conversion element 32. The light incident regions R of the polarization conversion element 32 are regions on which a plurality of narrow light fluxes having exited out of the optical integration system 31, which will be described later, are incident.

The mirror 42 for monitoring the amount of light is disposed in the position where the second lens array 31b forms a secondary light source image Q of the illumination light. In the description, a case where the mirror 42 for monitoring the amount of light is disposed in the optical path between the optical integration system 31 and the polarization conversion element 32 is presented by way of example. In place of the example described above, the mirror 42 for monitoring the amount of light may be disposed in the optical path between the polarization conversion element 32 and a superimposing lens 33a.

The illumination light WL having passed through the polarization conversion element 32 and therefore has polarization directions aligned with one another enters the superimposing lens 33a. The superimposing lens 33a superimposes the plurality of narrow light fluxes having exited out of the polarization conversion element 32 on one another on a target to be illuminated. The target to be illuminated can therefore be uniformly illuminated. The superimposing system 33 is formed of the optical integration system 31, which is formed of a first lens array 31a and a second lens array 31b, and the superimposing lens 33a.

In the present embodiment, the mirror 42 for monitoring the amount of light is disposed in the optical path between the optical integration system 31 and the polarization conversion element 32 and in the position where the secondary light source image Q is incident. Therefore, even when the mirror 42 for monitoring the amount of light is disposed in the optical path described above and draws out part of the light, no illuminance unevenness occurs on the light modulator 4R for red light, the light modulator 4G for green light, and the light modulator 4B for blue, each of which is a region to be illuminated. Therefore, in a case where a decrease in illuminance corresponding to one secondary light source image is acceptable, the mirror 42 for monitoring the amount of light is not necessarily a mirror that transmits part of light but reflects the remainder and may instead be a mirror that reflects the entire light.

A description will now be given on the case where the driver 45 changes the Z-direction positional relationship described above.

Figure 7A:
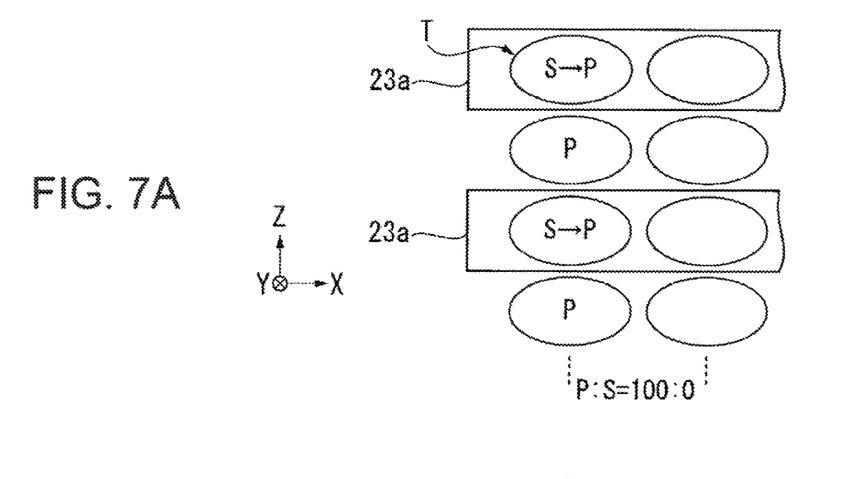
FIG. 7A shows the polarization state of combined light having passed through the polarization state conversion element.
Figure 7B:
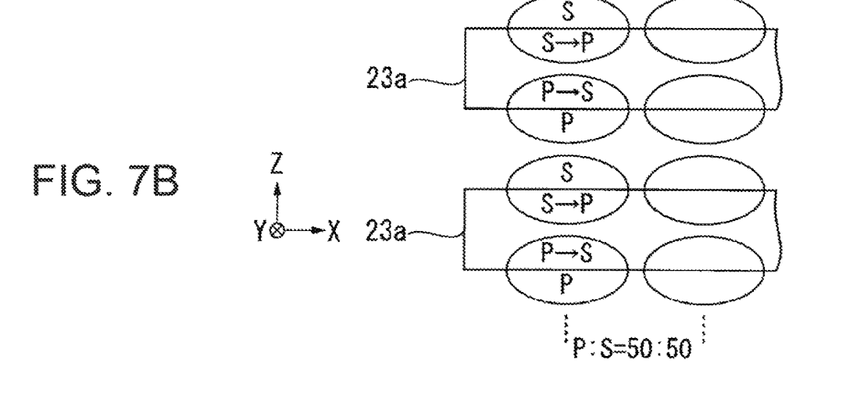
FIG. 7B shows the polarization state of the combined light having passed through the polarization state conversion element.
Figure 7C:
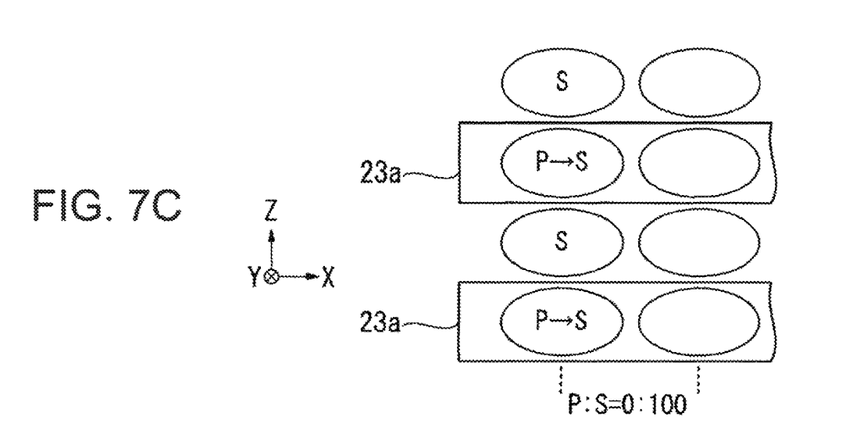
FIG. 7C shows the polarization state of the combined light having passed through the polarization state conversion element.

FIGS. 7A to 7C show the polarization state of the combined light T having passed through the polarization state conversion element 23. In FIGS. 7A to 7C, the reference character P corresponds to light that is part of the combined light T and formed of the P-polarized component, the reference character S corresponds to light that is part of the combined light T and formed of the S-polarized component, S→P corresponds to light formed of the P-polarized component converted from the S-polarized component by passage through the polarization state conversion element 23, and P→S corresponds to light formed of the S-polarized component converted from the P-polarized component by passage through the polarization state conversion element 23.

Movement of the polarization state conversion element 23 in the direction Z changes the ratio between the area of the portion where the first regions A1 and the retardation elements 23a overlap with each other and the area of the portion where the second regions A2 and the retardation elements 23a overlap with each other. For example, in FIG. 7A, the ratio is 100:0. In FIG. 7B, the ratio is 50:50. In FIG. 7C, the ratio is 0:100. Controlling the Z-direction positional relationship described above therefore allows adjustment of the ratio between the P-polarized component and the S-polarized component that form the combined light T over the range from 100:0 to 0:100.

The combined light T having passed through the polarization state conversion element 23 enters the homogenizer system 24. The homogenizer system 24 is formed, for example, of a first lens array 24a and a second lens array 24b. The first lens array 24a includes a plurality of first lenslets 24am, and the second lens array 24b includes a plurality of second lenslets 24bm.

The combined light T having passed through the homogenizer system 24 is incident on the polarization separation element 25. The polarization separation element 25 includes a transparent substrate 25a and a polarization separation film 25b supported by the transparent substrate 25a. The polarization separation film 25b transmits the P-polarized component of the combined light T but reflects the S-polarized component of the combined light T.

In the following sections, the following reference characters in FIG. 2 are defined for ease of description as follows: Reference character BL3p denotes P-polarized blue light that is part of the combined light T having passed through the polarization state conversion element 23 and which passes through the polarization separation film 25b; and reference character BL3s denotes S-polarized blue light that is part of the combined light T having passed through the polarization state conversion element 23 and which is reflected off the polarization separation film 25b.

The blue light BL3p having passed through the polarization separation film 25b passes through the retardation film 26 and the first pickup lens unit 27 and is incident on the diffuser wheel 28. The blue light BL3p incident on the diffuser wheel 28 corresponds to the "second light" described in the appended claims.

The retardation film 26 is formed of a quarter-wave plate. The blue light BL3p, when passing through the retardation film 26, is converted into, for example, right-handed circularly polarized blue light BL3c. The blue light BL3c enters the first pickup lens unit 27.

The first pickup lens unit 27 causes the blue light BL3c to converge toward the diffuser plate 28. The first pickup lens unit 27 is formed, for example, of two pickup lenses 27a and 27b.

The first pickup lens unit 27 cooperates with the homogenizer system 24 to achieve a uniform illuminance distribution of the blue light BL3c on the diffuser wheel 28. In the present embodiment, the diffuser wheel 28 is disposed at the focal point of the first pickup lens unit 27.

The diffuser wheel 28 diffuses the blue light BL3c having exited out of the first pickup lens unit 27 and reflects the diffused light beam BL3c toward the polarization separation element 25. The diffuser wheel 28 converts, for example, the right-handed circularly polarized blue light BL3c into left-handed circularly polarized blue light BL3d.

The diffuser wheel 28 includes a diffusing reflective plate 61 and a motor 62 for rotating the diffusing reflective plate 61. The diffusing reflective plate 61 is formed, for example, by forming irregularities on a surface of a light reflective member. The diffusing reflective plate 61 has, for example, a circular shape when viewed in the direction of the axis of rotation.

The left-handed circularly polarized blue light BL3d (diffused light) having been reflected off the diffuser wheel 28, and having passed through the first pickup lens unit 27 again, passes through the retardation film 26 again, which converts the blue light BL3d into S-polarized blue light BL4. The S-polarized blue light BL4 is reflected off the polarization separation element 25 and directed toward the optical integration system 31.

The blue light BL3s reflected off the polarization separation film 25b passes through the second pickup lens unit 29 and then enters the phosphor wheel 30. The blue light BL3s incident on the phosphor wheel 30 corresponds to the "first light" described in the appended claims. The second pickup lens unit 29 causes the blue light BL3s to converge toward the phosphor wheel 30 as excitation light. The second pickup lens unit 29 cooperates with the homogenizer system 24 to achieve a uniform illuminance distribution of the blue light BL3s on a phosphor layer 36.

The second pickup lens unit 29 is formed, for example, of two pickup lenses 29a and 29b.

The phosphor wheel 30 includes a disc 35, the phosphor layer 36, which is formed in a ring shape on the disk 35, and a motor 37, which rotates the disk 35. The disc 35 is formed of a metal member that excels in heat dissipation.

The phosphor layer 36 contains phosphor particles that absorb the blue light BL3s, convert the blue light BL3s into the yellow fluorescence YL, and emit it. The phosphor particles can, for example, be a YAG-based (yttrium-aluminum-garnet-based) phosphor. The phosphor particles may be made of one type of material or may be a mixture of particles made of two or more types of material. In the present embodiment, the fluorescence YL corresponds to the "third light" described in the appended claims.

A reflector 38 is provided between the disc 35 and the phosphor layer 36. On the basis of the configuration described above, the phosphor wheel 30 emits the fluorescence YL produced by the phosphor layer 36 toward the second pickup lens unit 29.

The fluorescence YL is parallelized by the second pickup lens unit 29. The polarization separation element 25 has the function of transmitting light that belongs to the wavelength band of the fluorescence YL irrespective of the polarization state thereof, so that the fluorescence YL passes through the polarization separation element 25 and is combined with the blue light BL4 reflected off the polarization separation element 25. The thus produced white illumination light WL enters the optical integration system 31.

The optical integration system 31 is formed, for example, of a lens array 31a and a lens array 31b. The lens arrays 31a and 31b are each formed of a plurality of lenslets arranged in an array.

The illumination light WL having passed through the optical integration system 31 is incident on the polarization conversion element 32. The polarization conversion element 32 is formed of a polarization separation film and a retardation film. The polarization conversion element 32 converts the illumination light WL containing the non-polarized fluorescence YL into linearly polarized light.

The illumination light WL having passed through the polarization conversion element 32 enters the superimposing lens 33a. The superimposing lens 33a cooperates with the optical integration system 31 to achieve a uniform illuminance distribution of the illumination light WL in the region to be illuminated (light incident surface of each of light modulators 4R, 4B, and 4B).

The present embodiment provides an idea of measures against a shift in white balance due to a change with time that occurs when the projector 1 is used, and the idea will next be described with reference to the flowchart in FIG. 8.

It is assumed in the description that the output from the first light source unit 20 decreases. When the output from the first light source unit 20 decreases (step S1 in FIG. 8), the amount of light beam flux K1 decreases, and the amount of blue light BL3s and the amount of blue light BL3p both decrease accordingly. It is, however, noted that the ratio between the amount of blue light BL3s and the amount of blue light BL3p remains constant. A decrease in the amount of blue light BL3s is equivalent to a decrease in optical density (amount of light per unit area) of the blue light BL3s in the phosphor layer 36 (step S2 in FIG. 8).

In general, a phosphor is characterized in that when the optical density of excitation light decreases, the conversion efficiency of the phosphor, which is the efficiency at which the excitation light is converted into fluorescence, increases. Therefore, when the decrease in the amount of blue light BL3s, which is the excitation light, is relatively small, an increase in the conversion efficiency increases the amount of fluorescence YL (step S3 in FIG. 8). The following description will be made with an example in which the amount of fluorescence YL increases, but the amount of fluorescence YL may decrease in some cases. In both cases, the white balance deteriorates.

The amount of blue light BL4 also decreases in response to the decrease in the output from the first light source unit 20. However, since the conversion efficiency of the phosphor increases, the ratio of the amount of fluorescence YL to the amount of blue light BL4 increases. The white balance of the illumination light WL therefore changes (step S4 in FIG. 8).

Figure 8:
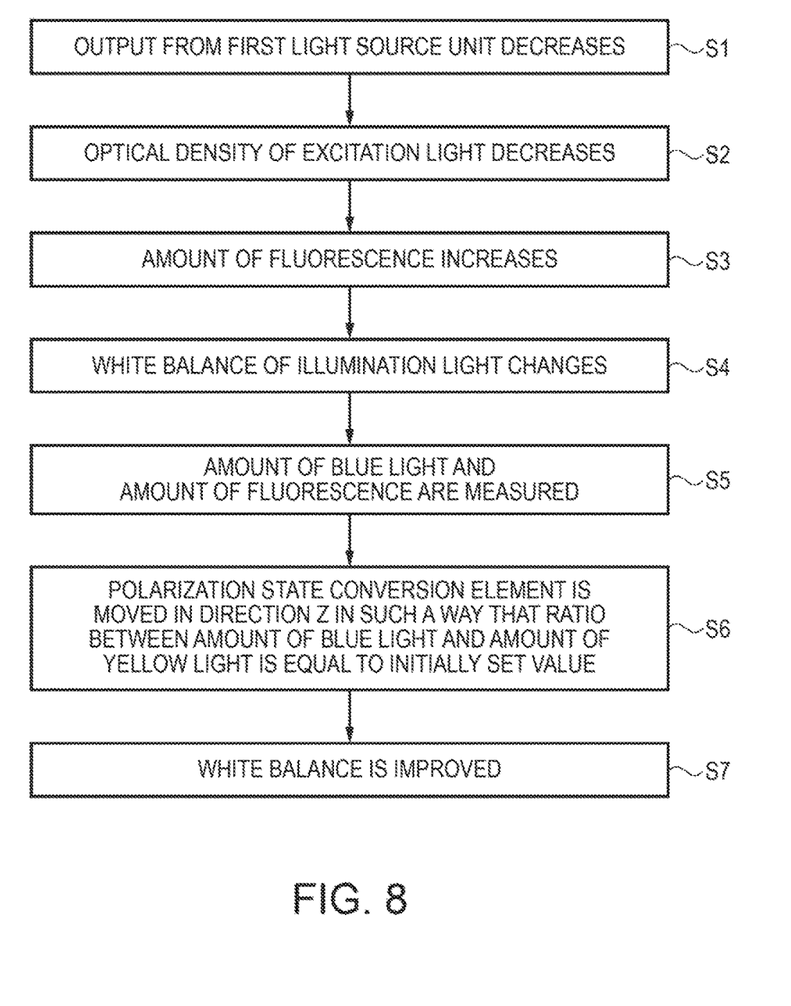
FIG. 8 is a flowchart for describing the action of adjusting white balance.

In the present embodiment, the amount of blue light BL4 (blue light intensity) and the amount of yellow fluorescence YL (yellow light intensity) contained in the light extracted by the mirror 42 for monitoring the amount of light are measured by the sensor unit 43 (step S5 in FIG. 8). The sensor unit 43 transmits a result of the measurement to the controller 44.

In the present embodiment, the controller 44 stores a value representing the ratio between the blue light intensity and the yellow light intensity and corresponding to a design value of the white balance as a reference value. To obtain designed white balance, the reference value described above may be changed, for example, from 20:80 to 25:75.

The controller 44 compares the ratio between the current blue light intensity and yellow light intensity measured by the sensor unit 43 (intensity ratio) with the reference value. As a result of the comparison, when the difference between the current intensity ratio and the reference value does not fall within an acceptable range, the controller 44 controls the driver 45 to move the polarization state conversion element 23 in the direction Z in such a way that the current intensity ratio approaches the reference value (step S6 in FIG. 8).

Moving the polarization state conversion element 23 in the direction Z allows adjustment of the ratio between the amount of S-polarized component (blue light BL3s) of the combined light T and the amount of P-polarized component (blue light BL3p) of the combined light T.

Specifically, the polarization state conversion element 23 is so moved that the amount of blue light BL3p increases but the amount of blue light BL3s decreases. As a result, the ratio of the amount of fluorescence YL to the amount of blue light BL4 decreases, whereby the white balance can be improved (step S7 in FIG. 8).

The above description has been made with reference to the case where the output from the first light source unit 20 decreases, and the white balance can be similarly improved also in a case where the output from the second light source unit 21 decreases.

As described above, according to the illuminator 2 of the present embodiment, the polarization state conversion element 23 can be moved in the direction Z to adjust the ratio between the P-polarized component and the S-polarized component of the combined light T. In the case where the polarization state of the combined light is converted by rotating the retardation film as in the related art, if the light source emits the P-polarized and S-polarized components of the same amount, the ratio between the S-polarized component traveling toward the phosphor wheel 30 and the P-polarized component traveling toward the diffuser wheel 28 cannot be changed even by rotating the retardation film.

In contrast, according to the present embodiment, even when the light source 19 emits the P-polarized and S-polarized components of the same amount, the ratio between the P-polarized component and the S-polarized component of the combined light T can be adjusted, allowing adjustment of the white balance of the illumination light WL.

Further, since the mirror 42 for monitoring the amount of light extracts and detects part of the secondary light source image Q, the white balance can be precisely adjusted with no illuminance unevenness on the light modulator 4R for red light, the light modulator 4G for green light, or the light modulator 4B for blue light.

According to the present embodiment, the projector 1, which includes the illuminator 2 described above, allows excellent white balance of an image and high-quality display.

The timing when the white balance is adjusted, that is, the timing when the blue light intensity and the yellow light intensity are monitored and the polarization state conversion element 23 is moved is desirably so set as to, for example, be immediately after the main power supply of the projector 1 is turned on.

Performing the adjustment immediately after the main power supply of the projector 1 is turned on as described above allows a user to hardly recognize a change in color tone of an image. However, if the white balance is adjusted only immediately after the main power supply of the projector 1 is turned on, a situation in which white balance deteriorates during use of the projector 1 cannot be handled. The white balance may therefore be adjusted at predetermined time intervals even during use of the projector 1.

Second Embodiment

An illuminator according to a second embodiment will subsequently be described. The present embodiment differs from the first embodiment in that the first light source unit 20 and the second light source unit 21 are reduced in size. In the present embodiment, the polarization state conversion element is configured differently because the first light source unit 20 and the second light source unit 21 are reduced in size.

In the following description, the configurations and members common to those in the first embodiment have the same reference characters and will not be described in detail or will be described in a simplified manner.

Figure 9:
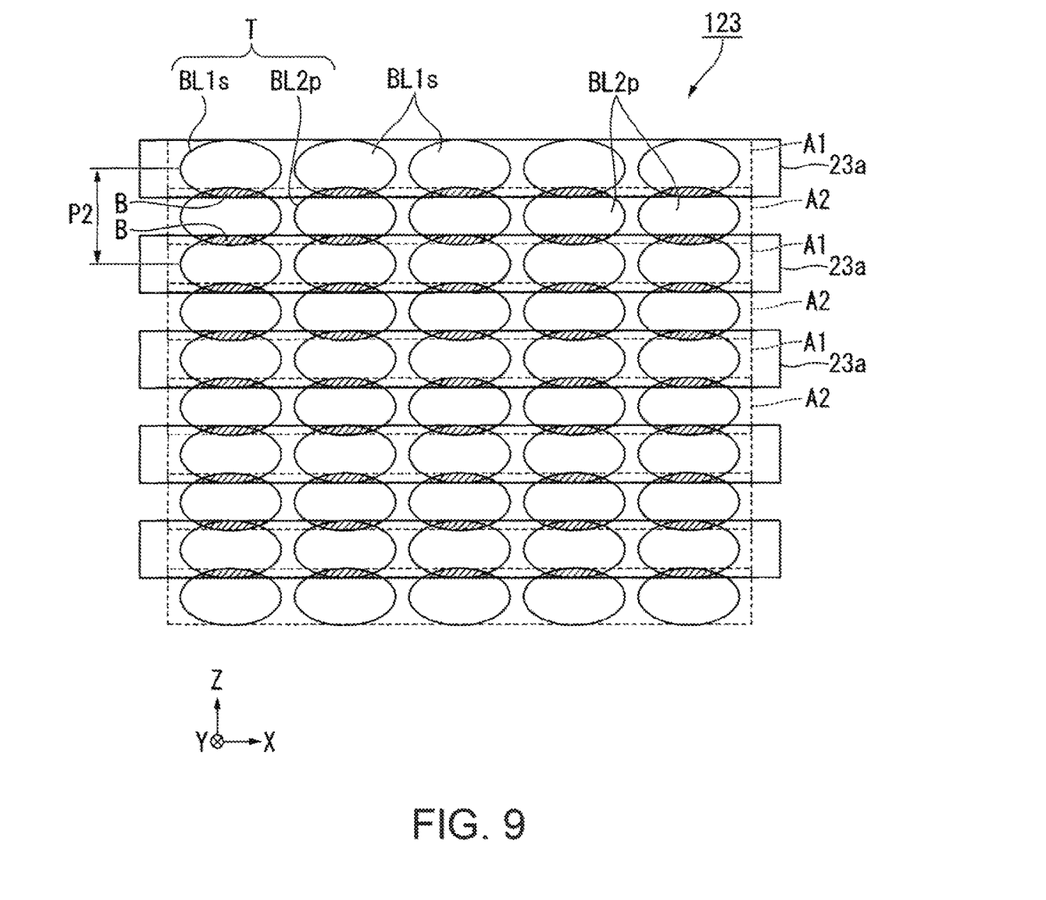
FIG. 9 shows the combined light incident on a polarization state conversion element in a second embodiment.

FIG. 9 shows the combined light T incident on a polarization state conversion element 123 in the present embodiment. That is, FIG. 9 corresponds to FIG. 4 in the first embodiment.

In the present embodiment, the pitch of the first regions A1 is equal to the pitch of the laser rows 20L or is P2. The pitch of the second regions A2 is equal to the pitch of the laser rows 21L or is P2. The pitch of the retardation elements 23a is also P2.

In the present embodiment, to reduce the size of the light source 19, the pitch P2 is so set to be smaller than the pitch P1 in the first embodiment. The light beams BL1s and the light beams BL2p partially overlap with each other, as shown in FIG. 9, unlike in the first embodiment. That is, the first regions A1 and the second regions A2 partially overlap with each other.

In the present embodiment, the width of the retardation element 23a in the direction Z is equal to the width of the light beam BL1s in the direction Z. FIG. 9 shows a state in which the polarization state conversion element 123 is so positioned that the entirety of one light beam BL1s is incident on the corresponding retardation element 23a. In this positioning, a central portion of one light beam BL2p passes through the space between two retardation elements 23a adjacent to each other, but end portions of the light beam BL2p on opposite sides in the direction Z are incident on the retardation elements 23a. A portion that forms a light beam BL2p and is incident on the retardation element 23a is hereinafter referred to as an overlapping portion B. One light beam BL2p has two overlapping portions B, and the overlapping portions B are hatched in FIG. 9.

The S-polarized light beams BL1s pass through the retardation elements 23a, which convert S-polarized light beams BL1s into the P-polarized light beams BL1p. The overlapping portions B of the light beams BL2p are incident on the retardation elements 23a, which convert the overlapping portions B into the S-polarized light beams BL2s. The polarization state of the portion of the light beams BL2p other than the overlapping portions B does not change. The light beam fluxes K1 and K2 are therefore distributed to the blue light BL3p and the blue light BL3s in the same manner as in the first embodiment and effectively used in the downstream optical system.

Consider now that a plurality of stripe mirrors are used in place of the polarization combining element 22 as a component for combining the light beam fluxes K1 and K2 with each other. When the stripe mirrors are each so sized that the entirety of one light beam BL1s is incident on the mirror, the overlapping portions B of the light beams BL2p shown in FIG. 9 are blocked by the stripe mirrors and cannot therefore be used as the combined light T. Further, the stripe mirrors and the laser rows corresponding thereto need to be aligned with each other with high precision.

In contrast, according to the configuration of the present embodiment, even in a case where the pitch P2 of the laser rows 20L and the laser rows 21L is set at a short value that causes the light beams BL1s and the light beams BL2p to partially overlap with each other for reduction in size of the light source 19, the light beam fluxes K1 and K2 are combined with each other with a very small amount of loss. Further, the light beam fluxes K1 and K2 can be effectively used in the downstream optical system. Moreover, positioning the laser rows and the polarization combining element 22, which is a component for combining the light beam fluxes K1 and K2 with each other, requires accuracy that is not so high unlike in the case where the stripe mirrors are used.

Let "a" (%) be the area ratio of one overlapping portion B to a light beam BL2p in the case where the polarization state conversion element 123 is disposed in the position shown in FIG. 9. The ratio between the P-polarized component and the S-polarized component that form the combined light T is (100−a):a.

Also in the present embodiment, changing the Z-direction positional relationship between the polarization state conversion element 123 and the optical axis of the combined light T allows adjustment of the ratio between the P-polarized component and the S-polarized component that form the combined light T. In the present embodiment, the ratio between the P-polarized component and the S-polarized component that form the combined light T can be changed over the range from (100−a):a to a:(100−a). The control of the position of the polarization state conversion element 123 is the same as that in the first embodiment and is not therefore described.

As described above, according to the present embodiment, even in the case where the pitch P2 of the laser rows 20L and the laser rows 21L is set at a short value that causes the light beams BL1s and the light beams BL2p to partially overlap with each other, the light beam fluxes K1 and K2 can be combined with each other with a small amount of loss and effectively used to produce the illumination light WL. That is, the size of the light source 19 can be reduced as compared with the size provided in the first embodiment with no optical loss, unlike the case where a plurality of stripe mirrors are used to combine light beams with one another.

The invention is not limited to the contents of the embodiments described above and can be changed as appropriate to the extent that the changes do not depart from the substance of the invention.

For example, in the embodiments described above, the case where the pitch of the first regions A1 is equal to the pitch of the retardation elements 23a has been presented by way of example, but is not necessarily so in other embodiments of the invention, and these pitches may not be equal to each other.

The width of the retardation element 23a may be set as appropriate. An optically isotropic region only needs to be present between two retardation elements 23a adjacent to each other.

In the first embodiment described above, in the polarization state conversion element 23, two light beams BL1s adjacent to each other in the direction Z are separate from each other but may instead partially overlap with each other. Similarly, in the polarization state conversion element 23, two light beams BL2p adjacent to each other in the direction Z are separate from each other but may instead partially overlap with each other.

In a case where it is desired to increase the width over which the ratio between the P-polarized component and the S-polarized component that form the combined light T is adjusted, a light beam BL1s and a light beam BL2p adjacent to each other in the direction Z are preferably in contact with each other. According to the configuration described above, the width over which the adjustment is made can be maximized whilst an increase in the size of the polarization state conversion element 23 can be minimized.

To reduce the size of the illuminator 2, a light beam BL1s and a light beam BL2p adjacent to each other in the direction Z preferably partially overlap with each other.

Further, in the embodiments described above, the projector 1 including the three light modulators 4R, 4G, and 4B is presented merely by way of example. The invention is not however limited to this arrangement and is for example also applicable to a projector that uses a single light modulator to display color video images. The light modulators may each be a digital mirror device.

Further, the above embodiments have been each described with reference to the case where the illuminator according to any of the embodiments of the invention is used in a projector, but this is not necessarily the case, and the illuminator according to any of the embodiments of the invention may be used in a lighting apparatus, such as a headlight of an automobile.

The entire disclosure of Japanese Patent Application No. 2016-173581, filed on Sep. 6, 2016 is expressly incorporated by reference herein.

What is claimed is:
1. An illuminator comprising:
 a first light source unit that includes a plurality of first solid-state light sources and outputs a plurality of first light beams;
 a second light source unit that includes a plurality of second solid-state light sources and outputs a plurality of second light beams having a polarization state different from a polarization state of the plurality of first light beams;

a polarization combining element that combines the plurality of first light beams with the plurality of second light beams;

a polarization state conversion element on which the combined light produced by the polarization combining element is incident;

a polarization separation element that separates the combined light having passed through the polarization state conversion element into first light and second light having a polarization state different from a polarization state of the first light; and a wavelength conversion element that converts the first light into third light, wherein the second light and the third light are outputted as illumination light, the polarization state conversion element includes a plurality of retardation elements that are separate from one another and arranged in a first direction, and the first light source unit and the second light source unit are so configured that a plurality of first regions through which the plurality of first light beams pass and a plurality of second regions through which the plurality of second light beams pass are alternately arranged in the first direction in the polarization state conversion element.

2. The illuminator according to claim 1, wherein the plurality of retardation elements are each formed of a half-wave plate.

3. The illuminator according to claim 1, further comprising a driver that changes a positional relationship between the polarization state conversion element and an optical axis of the combined light in the first direction.

4. The illuminator according to claim 3, further comprising a color balance detector that detects color balance of the illumination light, wherein the driver is configured to change the positional relationship in accordance with a signal from the color balance detector.

5. The illuminator according to claim 1, wherein one of the plurality of first light beams partially overlaps with one of the plurality of second light beams.

6. A projector comprising:

the illuminator according to claim 1;

a light modulator that modulates the illumination light from the illuminator in accordance with image information to form image light; and a projection system that projects the image light.

7. A projector comprising:

the illuminator according to claim 2;

a light modulator that modulates the illumination light from the illuminator in accordance with image information to form image light; and a projection system that projects the image light.

8. A projector comprising:

the illuminator according to claim 3;

a light modulator that modulates the illumination light from the illuminator in accordance with image information to form image light; and a projection system that projects the image light.

9. A projector comprising:

the illuminator according to claim 4;

a light modulator that modulates the illumination light from the illuminator in accordance with image information to form image light; and a projection system that projects the image light.

10. A projector comprising:

the illuminator according to claim 5;

a light modulator that modulates the illumination light from the illuminator in accordance with image information to form image light; and a projection system that projects the image light.

* * * * *